United States Patent [19]

Cranor

[11] Patent Number: 5,077,909
[45] Date of Patent: Jan. 7, 1992

[54] METHOD AND APPARATUS FOR MEASURING VALVE STEM WEAR

[75] Inventor: Vernon D. Cranor, Carol Stream, Ill.
[73] Assignee: Patten Industries, Inc., Elmhurst, Ill.
[21] Appl. No.: 651,146
[22] Filed: Feb. 6, 1991
[51] Int. Cl.$^5$ .............................................. G01B 5/12
[52] U.S. Cl. ........................................ 33/607; 33/833; 33/836
[58] Field of Search .................. 33/832, 833, 836, 838, 33/607, 600

[56] References Cited

U.S. PATENT DOCUMENTS

| | | | |
|---|---|---|---|
| 1,866,000 | 7/1932 | Alonzo | 33/654 |
| 2,819,534 | 1/1958 | Kitzman | 33/607 |
| 2,855,687 | 10/1958 | Price | 33/838 |
| 2,855,692 | 10/1958 | Campbell | 33/607 |
| 4,731,932 | 3/1988 | Kristensen | 33/501.06 |

OTHER PUBLICATIONS

Caterpillar Maintenance Management Schedules (4 pages), Sep. 1988.

*Primary Examiner*—Harry N. Haroian
*Attorney, Agent, or Firm*—Laff, Whitesel, Conte & Saret

[57] ABSTRACT

The need for engine maintenance is determined from valve stem wear by placing a cavity-containing housing of predetermined height on the cylinder head so that an exhaust valve stem on the cylinder head extends through the open bottom end of the housing into its cavity. A height measuring device, such as a depth micrometer, is supported on the top end of the housing and extends into the cavity of the housing until it contacts the top of the exhaust valve stem. At this point, the reading on the height measuring device indicates the distance between the top of the exhaust valve stem and the top of the housing. By subtracting this distance from the known height of the housing, the height of the exhaust valve stem can be calculated. By comparing the height of the exhaust valve stem when the engine is new to its height as periodically measured after the engine has been used, the increased height or "tulip condition" of the valves can be diagnosed, indicating the need for engine maintenance.

8 Claims, 1 Drawing Sheet

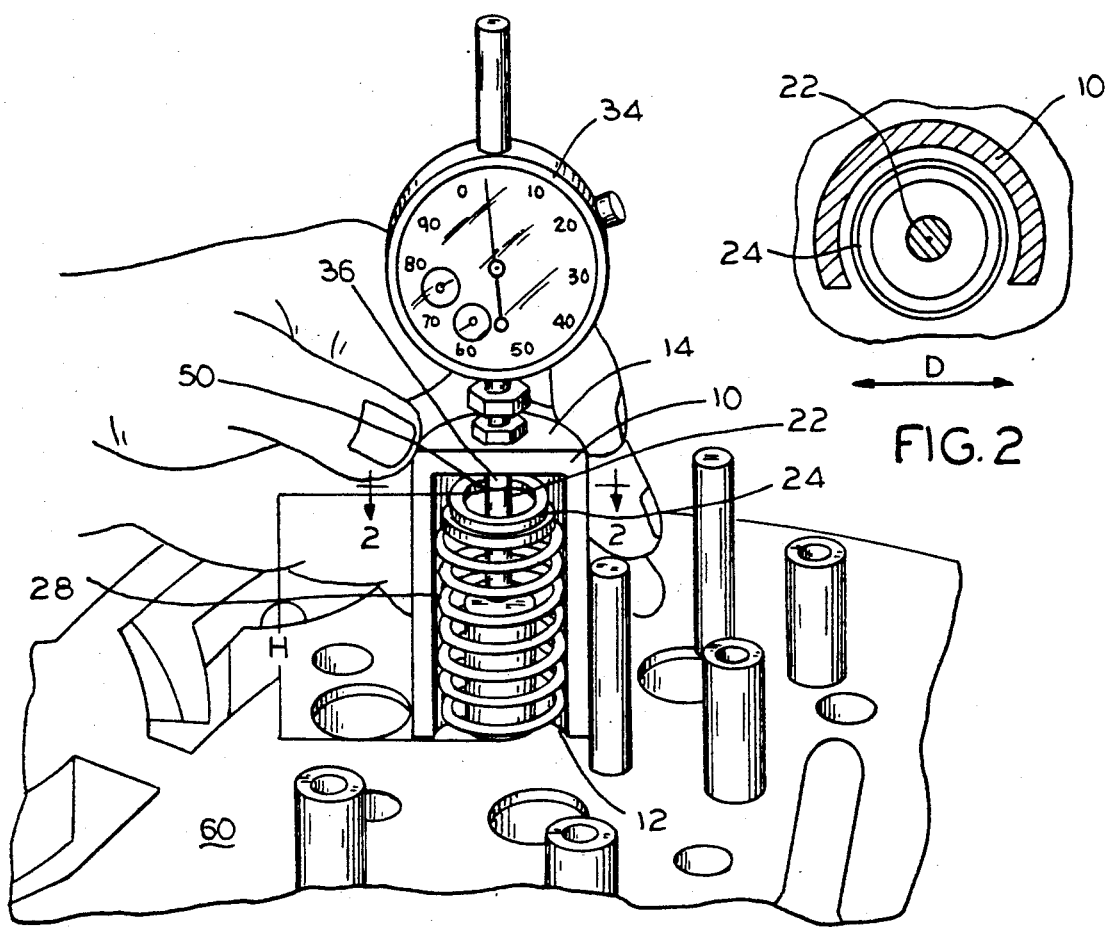
FIG. 2
FIG. 1
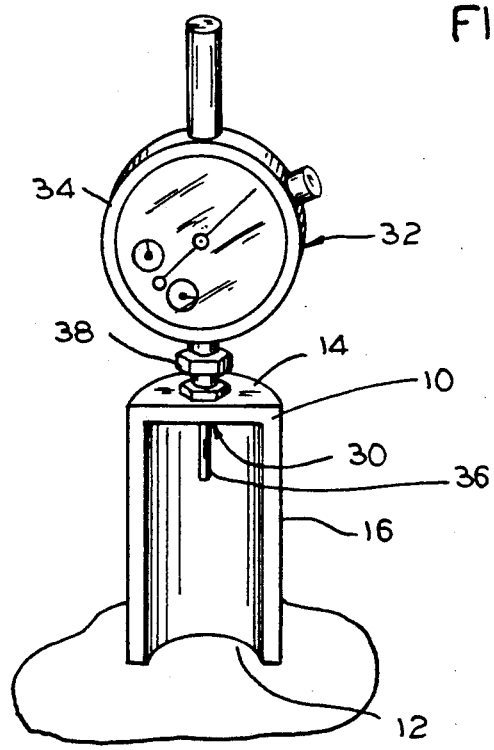
FIG. 3
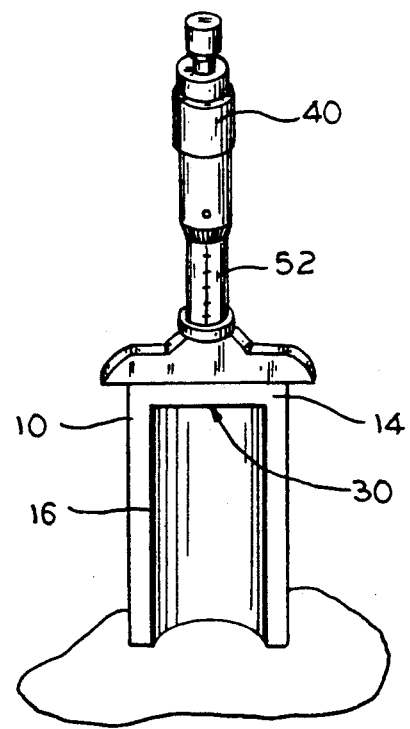
FIG. 4

METHOD AND APPARATUS FOR MEASURING VALVE STEM WEAR

This invention relates to engine maintenance and, more particularly, to a method and an apparatus for easily determining when engine maintenance is necessary.

BACKGROUND

Recent increases in petroleum prices have led to the development of "drier" fuels for engines used in heavy equipment and vehicles, such as earth-moving equipment, trucking, locomotives, and farm machinery. Drier fuels usually include methane, which tends to be corrosive to, and produce greater heat in the engines. These fuels, in turn, have led to spark ignited engines, which are more efficient at running on the drier fuels. Manufacturers of the spark ignited engines recommend regular maintenance checks, such as every 750 hours of operation.

An important part of the maintenance check includes checking the exhaust valves for a "tulip condition". A tulip condition is characterized by a bulge or concavity in the head of an engine valve, which causes the valve stem to extend upwardly from the engine head more than normal. The tulip condition is usually caused by excessive heat from the dry fuels used in the engine, which breaks the grain lines in the metal and deforms it.

One recommended way to check for a tulip condition is to periodically measure the exhaust valve stem height to determine if it has changed since the last maintenance check. There are usually two exhaust valves per cylinder, and four to sixteen cylinders per engine. The valve stem height is measured when the engine is new, to establish a baseline measurement, and then that baseline height is compared to the measured height at future maintenance checks. In the past, valve stem heights were measured after taking the engine apart, including the rocker box. This was a time-consuming and expensive procedure. The valve stem height has also been measured with a depth micrometer extending from a bar placed across the top of the rocker box, to save disassembly costs. But if the rocker box was ever removed or disturbed in the future, as it frequently is during maintenance, the baseline measurement would no longer be valid and could not be validly compared to future valve stem height measurements. Also, the rocker box has a compressible gasket which could affect each measurement due to inconsistent compression. Thus, there is a need for an inexpensive and reliable way to measure exhaust valve stem height.

SUMMARY OF THE INVENTION

It is an object of the invention to measure exhaust valve stem height in an inexpensive and reliable manner. It is a further object of the invention to measure valve stem height without disassembling most of the engine. It is yet another object of the invention to measure valve stem height without dependence on the position of the rocker box.

An apparatus for measuring exhaust valve stem height according to the invention includes a support member and a measuring device supported thereon. The support member is a housing having a longitudinal dimension height which is a predetermined length greater than the length or height of the valve stem to be measured. The support member also has an aperture at one longitudinal end for receiving the measuring device. The measuring device is a conventional type in which a movable extension is connected to a calibrated dial. The movable extension extends through the aperture into the housing, while the dial remains above the housing. When measuring, the housing is placed on the cylinder head of the engine adjacent to the valve stem, so that the movable extension can be manipulated to rest on the top of the valve stem and thereby measure its height with the calibrated dial.

BRIEF DESCRIPTION OF THE DRAWINGS

The above mentioned and other features of the invention will become more apparent and the invention itself will be best understood by reference to the following description of embodiments of the invention taken in conjunction with the accompanying drawings, in which:

FIG. 1 is a perspective view of the invention in position to measure the exhaust valve stem height.

FIG. 2 is a cross-sectional view of the invention and an exhaust valve taken along 2—2 of FIG. 1.

FIG. 3 is another perspective view of the invention.

FIG. 4 is a perspective view of another embodiment of the invention.

DETAILED DESCRIPTION OF THE INVENTION

An apparatus for measuring exhaust valve stem wear according to the invention includes a support member 10 (FIG. 1). The support member 10 is shown as a semi-cylindrical housing, although other shapes having the characteristics described herein would also be suitable. The housing has an open bottom end 12 and a mostly closed top end 14 (FIG. 3). The housing defines an open cavity 16 having a diameter or width greater than the diameter or width D of an exhaust valve stem assembly 20 (FIG. 2).

The valve stem assembly 20 typically includes a valve stem 22, valve rotor retainer 24, and valve spring 28. The distance from the bottom end 12 to the top end 14 is greater than the height H (FIG. 1) of the valve stem to be measured. Thus, the valve stem assembly 20 easily fits within housing cavity 16.

The top end 14 of housing 10 preferably has an aperture 30 to receive a measuring instrument (FIG. 3). One suitable measuring instrument is available from Caterpillar as gauge no. 6V6106 (FIG. 3). This gauge 32 includes a calibrated dial 34 and an extendible leg 36. Leg 36 extends through aperture 30 into cavity 16. The gauge 32 is held in place above housing 10 by collet 38.

An alternative measuring instrument is shown in FIG. 4. A depth micrometer 40 is attached to the top end 14 of housing 10, so that its contact end (not shown) can extend through aperture 30 into cavity 16. The calibrated end 52 remains above the housing.

With either embodiment, the invention is easy to use. When an engine is new, a baseline measurement of the exhaust valve stem height is obtained. The cylinder head 60 of the engine (FIG. 1) is exposed so that the inventive housing with an attached measuring instrument can rest upon it. The cylinder head, unlike the rocker box used as a base for valve stem measurements in the past, does not shift its position relative to the valve stems over the life of the engine.

The housing is positioned so that the exhaust valve stem 22, with its associated rotor retainer and spring, are within the housing cavity 16. Using the depth micrometer 40, (FIG. 4), the contact end is brought into contact with the top 50 of the valve stem. The distance between the top 14 of the housing 10 and the top 50 of the valve stem is determined by reading the calibrated end 52. When this distance is subtracted from the known height of housing 10, the actual height H of the valve stem is determined.

Periodically thereafter, such as when oil changes are made to the engine, the valve stem height is checked for changes. This is preferably done with gauge 32. The gauge is "zeroed" with the baseline measurement obtained with the depth micrometer, so that any change in the valve stem height is shown directly on the dial 34. The spring-loaded extension leg 36 bears against the top 50 of the valve stem, and its height can then be determined from dial 34.

When the exhaust valve stem height reaches the critical height (usually specified by the manufacturer), the necessary maintenance can be implemented. The invention not only saves on engine disassembly costs during each oil change (which for many large engines occurs every 750 hours of operation), but it may also save the cost of a new engine by easily and reliably measuring valve stem wear. When the engines cost anywhere from a few thousand dollars for a small engine to hundreds of thousands of dollars for a locomotive engine, the savings is substantial.

Those who are skilled in the art may readily perceive how to modify the invention. Therefore, the following claims are to be construed to cover all equivalent methods and structures which fall within the true scope and spirit of the invention.

What is claimed is:

1. A method of determining when maintenance is necessary on the engines of heavy equipment, vehicles, and farm machinery, comprising:
    (a) positioning on a cylinder head of an engine a cavity-containing housing of predetermined height having a top end and height measuring means supported on said top end, said housing at least partially surrounding an exhaust valve stem of said engine, said height measuring means being extendible into said housing toward said exhaust valve stem;
    (b) measuring the distance between said top of said exhaust valve stem and said top end of said housing;
    (c) calculating a baseline measurement for a height of said exhaust valve stem on a new engine from the difference between said predetermined height of said housing and said distance measured in step (b);
    (d) periodically after the engine has been used, repeating steps (a) and (b) and then again calculating the height of said exhaust valve stem from the difference between said predetermined height of said housing and said distance measured between said top of said exhaust valve stem and said top of said housing; and
    (e) comparing the valve stem heights from the new engine and the used engine as calculated in steps (c) and (d) to determine whether there has been a change.

2. The method of claim 1 wherein said housing is semicylindrical and has a bottom end for resting on said cylinder head.

3. The method of claim 2 wherein said housing has a longitudinal dimension between said bottom and top ends which is greater than the height of the valve stem to be measured.

4. The method of claim 1 wherein step (b) includes extending said height measuring means into said cavity of said housing until it contacts a top of said exhaust valve stem.

5. The method of claim 4 wherein said height measuring means used in step (d) is a dial gauge.

6. The method of claim 5 wherein step (d) includes the preliminary step of zeroing the dial gauge to the baseline measurement of step (c).

7. The method of claim 4 wherein said height measuring means of step (b) is a depth micrometer.

8. The method of claim 1 including the additional step of repeating steps (a) through (e) for each of the exhaust valve stems on an engine.

* * * * *